US007218912B2

(12) United States Patent
Erskine et al.

(10) Patent No.: US 7,218,912 B2
(45) Date of Patent: May 15, 2007

(54) METHOD AND SYSTEM FOR PROVIDING SUPERVISORY CONTROL OVER WIRELESS PHONE USAGE

(75) Inventors: Thomas Erskine, Marblehead, MA (US); Kenneth W. Sonberg, Andover, MA (US); Luther Rudisill, Parker, TX (US)

(73) Assignee: Boston Communications Group, Inc., Woburn, MA (US)

( * ) Notice: Subject to any disclaimer, the term of this patent is extended or adjusted under 35 U.S.C. 154(b) by 0 days.

(21) Appl. No.: 11/372,305

(22) Filed: Mar. 9, 2006

(65) Prior Publication Data

US 2006/0160523 A1  Jul. 20, 2006

Related U.S. Application Data

(62) Division of application No. 10/784,611, filed on Feb. 23, 2004.

(60) Provisional application No. 60/449,907, filed on Feb. 25, 2003.

(51) Int. Cl.
*H04M 11/00* (2006.01)
(52) U.S. Cl. ............... 455/405; 455/456.1; 455/560
(58) Field of Classification Search ............... 455/405, 455/406, 419, 414, 456, 560; 709/225, 329; 379/196, 88; 370/329
See application file for complete search history.

(56) References Cited

U.S. PATENT DOCUMENTS 4,490,345 A   12/1984  Kwak ..................... 423/389
4,908,848 A    3/1990  Hanawa ................... 379/63
5,657,377 A    8/1997  Pinard et al. ............ 379/93.02

(Continued)

FOREIGN PATENT DOCUMENTS

WO   WO 02/058366   7/2002

(Continued)

OTHER PUBLICATIONS

The Teligent Mobile VPN Solution, Teligent.

(Continued)

*Primary Examiner*—Joseph Feild
*Assistant Examiner*—Michael Vu
(74) *Attorney, Agent, or Firm*—Weingarten, Schurgin, Gagnebin & Lebovici LLP

(57) ABSTRACT

A system for controlling wireless phone usage enables a supervisor to establish user profiles for supervised users of wireless phones across a range of parameters which are stored in a user profile database. Such parameters may include one or more locations at which use of the wireless phone is restricted or permitted. In addition, restrictions on phone use may be provided based upon total phone usage within a specified control period, time periods, dates or days of the week during which phone use is restricted or permitted. One or more lists including numbers that are always-accessible may be provided and one or more lists including numbers that are never-accessible may also be provided. In the event a call does not satisfy predefined criteria, the call is blocked. Predetermined messages may be played to the called or calling party as applicable when a call is blocked. Boolean combinations of restrictions and permissive use criteria for the wireless phone may be specified to provide for flexibility when establishing use criteria for the wireless phone.

8 Claims, 6 Drawing Sheets

U.S. PATENT DOCUMENTS

| | | | |
|---|---|---|---|
| 5,742,905 A | 4/1998 | Pepe et al. | 455/461 |
| 5,745,559 A | 4/1998 | Weir | 379/199 |
| 5,794,140 A | 8/1998 | Sawyer | 455/408 |
| 5,878,337 A | 3/1999 | Joao et al. | 455/406 |
| 5,884,193 A | 3/1999 | Kaplan | 455/565 |
| 5,903,830 A | 5/1999 | Joao et al. | 455/506 |
| 5,905,950 A | 5/1999 | Anell | 455/421 |
| 5,974,308 A | 10/1999 | Vedel | 455/407 |
| 6,029,065 A | 2/2000 | Shah | 455/414 |
| 6,073,010 A | 6/2000 | Dufour | 455/422 |
| 6,175,622 B1 | 1/2001 | Chiniwala et al. | 379/211 |
| 6,188,751 B1 | 2/2001 | Scherer | 379/88.22 |
| 6,188,883 B1 | 2/2001 | Takemura | 455/411 |
| 6,246,756 B1 | 6/2001 | Borland et al. | 379/142 |
| 6,292,833 B1 | 9/2001 | Liao et al. | 709/229 |
| 6,445,783 B1 | 9/2002 | Creswell et al. | 379/207.13 |
| 6,453,037 B1 | 9/2002 | Welter, Jr. | 379/243 |
| 6,456,706 B1 | 9/2002 | Blood et al. | 379/188 |
| 6,529,725 B1 | 3/2003 | Joao et al. | 455/406 |
| 6,564,047 B1 | 5/2003 | Steele et al. | 455/405 |
| 6,611,587 B2 | 8/2003 | Brown et al. | 379/221.14 |
| 6,622,017 B1 | 9/2003 | Hoffman | 455/419 |
| 6,650,894 B1 | 11/2003 | Berstis et al. | 455/420 |
| 6,725,031 B2 | 4/2004 | Watler et al. | |
| 6,871,082 B2 | 3/2005 | Cox et al. | 455/565 |
| 6,970,692 B2 | 11/2005 | Tysor | 455/405 |
| 7,002,937 B1 | 2/2006 | Dispensa et al. | 370/329 |
| 7,012,503 B2* | 3/2006 | Nielsen | 340/5.6 |
| 7,103,663 B2* | 9/2006 | Inoue et al. | 709/225 |
| 2001/0025280 A1 | 9/2001 | Mandato et al. | 707/3 |
| 2002/0022471 A1 | 2/2002 | Walter et al. | 455/405 |
| 2002/0025797 A1 | 2/2002 | Joao et al. | 455/406 |
| 2002/0049806 A1 | 4/2002 | Gatz et al. | 709/203 |
| 2002/0082002 A1 | 6/2002 | Fujii | 455/419 |
| 2002/0087649 A1 | 7/2002 | Horvitz | 709/207 |
| 2002/0114431 A1 | 8/2002 | McBridge et al. | 379/88.21 |
| 2002/0126820 A1 | 9/2002 | Barak et al. | 379/219 |
| 2002/0126821 A1 | 9/2002 | Barak et al. | 379/219 |
| 2002/0128984 A1 | 9/2002 | Mehta et al. | 705/71 |
| 2002/0136374 A1 | 9/2002 | Fleischer, III et al. | 379/114.01 |
| 2002/0136379 A1 | 9/2002 | Fleischer, III et al. | 379/196 |
| 2002/0137490 A1 | 9/2002 | Gallant | 455/411 |
| 2002/0168055 A1 | 11/2002 | Crockett et al. | 379/88.01 |
| 2002/0183051 A1 | 12/2002 | Poor et al. | 455/418 |
| 2003/0005135 A1* | 1/2003 | Inoue et al. | 709/229 |
| 2003/0013456 A1 | 1/2003 | Bates et al. | 455/456 |
| 2003/0045272 A1 | 3/2003 | Burr | 455/411 |
| 2003/0050044 A1 | 3/2003 | Awada et al. | 455/407 |
| 2003/0072433 A1 | 4/2003 | Brown et al. | 379/221.14 |
| 2003/0076941 A1 | 4/2003 | Tiliks et al. | 379/196 |
| 2003/0134626 A1 | 7/2003 | Himmel et al. | 455/419 |
| 2003/0139175 A1 | 7/2003 | Kim | 455/419 |
| 2003/0224803 A1 | 12/2003 | Konno | 455/456.1 |
| 2004/0043763 A1 | 3/2004 | Minear et al. | 455/419 |
| 2004/0064557 A1* | 4/2004 | Karnik et al. | 709/225 |
| 2004/0073672 A1 | 4/2004 | Fascenda | 709/225 |
| 2004/0110465 A1 | 6/2004 | Bedingfield et al. | 455/3.05 |
| 2004/0123147 A1 | 6/2004 | White | 713/201 |
| 2004/0132438 A1 | 7/2004 | White | 455/418 |
| 2004/0147255 A1 | 7/2004 | Lee | 455/422.1 |
| 2004/0171376 A1 | 9/2004 | Engstrom et al. | 455/419 |
| 2004/0180648 A1 | 9/2004 | Hymel et al. | 455/418 |
| 2004/0185830 A1 | 9/2004 | Joao et al. | 455/410 |
| 2004/0198335 A1 | 10/2004 | Campen | 455/419 |
| 2004/0203584 A1 | 10/2004 | White | 455/406 |
| 2004/0203601 A1 | 10/2004 | Morriss et al. | 455/411 |
| 2004/0203941 A1 | 10/2004 | Kaplan et al. | 455/466 |
| 2004/0203955 A1 | 10/2004 | White | 455/466 |
| 2005/0026592 A1 | 2/2005 | Walter et al. | 455/406 |
| 2005/0032510 A1 | 2/2005 | Ryu et al. | 455/419 |
| 2005/0096009 A1 | 5/2005 | Ackley | 455/405 |
| 2005/0113130 A1 | 5/2005 | Weinzierl | 455/550.1 |

FOREIGN PATENT DOCUMENTS

| | | |
|---|---|---|
| WO | WO 03/039099 | 5/2003 |
| WO | WO2005/031544 | 4/2005 |

OTHER PUBLICATIONS

IPSE Solutions, Advanced VPN.
Baypackets, RSI Voice VPN, 2002.
Apertico, Location Server, 2003.
Apertico, Location Server Broker, 2002.
Lucent Technologies, Virtual Private Network, 1999.
U.S. Appl. No. 60/481,428, filed May 5, 2005, Ackley.
Sixbell, AccountManagerPortal; "Control and Administrative Mobile Phone Expenses Via Web", date unknown.
Sixbell, Account Manager Portal, 2001.
International Telecommunication Union, Q.1211, "General Recommendations on Telephone Switching and Signalling", Mar. 1993.
International Telecommunication Union, Q.1219, "Intelligent Network User's Guide for Capability Set 1", Apr. 1994.
Intelligent Networks, Standards and Services; T.W. Abernathy and A.C. Munday; BT Technol J vol. 13 No.; Apr. 2, 1995.
*The Magic of IN; Mercury Communications Ltd.*; Feb. 1993.
"begi SELFCare"; Boston Communications Group, Inc.; Sep. 2001.

* cited by examiner

METHOD AND SYSTEM FOR PROVIDING SUPERVISORY CONTROL OVER WIRELESS PHONE USAGE

CROSS REFERENCE TO RELATED APPLICATIONS

This application is a divisional application of U.S. application Ser. No. 10/784,611 filed Feb. 23, 2004 which claims the benefit under 35 USC §119(e) of provisional application Ser. No. 60/449,907, entitled "METHOD AND SYSTEM FOR EXERCISING SUPERVISORY CONTROL OVER WIRELESS PHONE USAGE", filed Feb. 25, 2003.

STATEMENT REGARDING FEDERALLY SPONSORED RESEARCH OR DEVELOPMENT

N/A

BACKGROUND OF THE INVENTION

The present invention generally relates to wireless communication systems and more specifically to a method and system for providing supervisory control over wireless phone usage.

Wireless phones are widely used in this country. Wireless phone service providers typically allow a wireless phone subscriber to place calls at any time. For reasons of safety and convenience, more and more parents are inclined to have their children of school age carry wireless phones to make it easier for their children to contact them and vice versa. It has also been observed, however, that many children that are provided wireless phones tend to spend inordinate amounts of time on calls to friends during the school day and late into the evenings, and that the availability of wireless phones can present a distraction during the school day. Presently available wireless phone systems provide no way to adequately provide supervisory control of wireless phone usage by others, e.g. children.

Accordingly, it would be desirable to have a method and system by which supervisory control may be exercised over wireless phone usage. It would further be desirable to be able to establish a user profile for wireless phone service on a user by user basis without intervention by the telephone service provider. Moreover, it would be desirable to be able to have the ability to allow a supervisor to modify the user profile as circumstances warrant without requiring human intervention by the telephone service provider so as to allow a supervisor to readily change the nature of the wireless service available to supervised individuals.

BRIEF SUMMARY OF THE INVENTION

In accordance with the present invention, a method and system for exercising supervisory control over wireless phone usage is disclosed. The disclosed system allows a Supervisor, such as a parent or manager, to establish individual profiles for supervised Users of respective wireless phones across a range of parameters. For example, a parent may establish user profiles for each child that is to be provided a wireless phone. The user profiles allow the use of the respective phones by the child subject to controls on incoming and/or outgoing calls as specified by the Supervisor. For example, the disclosed system allows the Supervisor to limit the total phone usage time within a specified control period, such as a week or a month, to a predetermined number of minutes and, to prevent incoming or outgoing calls during specified periods, such as school hours, except from predetermined numbers (always accessible numbers) specified by the Supervisor. Restrictions on phone usage may also be defined with regard to incoming or outgoing calls while the phone is at or near defined geographic locations. For example, calls may be blocked while the phone is within the grounds of a school attended by the user. Additionally, a location restriction may be employed in conjunction with other restrictions on phone use and capabilities described herein. For example, calls may be restricted if the wireless phone is at a prescribed geographic location and the time is within a time period specified by the Supervisor. More specifically, the decision whether to block or permit a call may be made as a Boolean function of any of the applicable restrictive or permissive criteria applicable to phone usage herein described. The location of the wireless phone may be obtained using cell sector identifiers alone or in combination with signal strength information, a global positioning system receiver disposed within the wireless phone or any other suitable technique for resolving the geographic location of the wireless phone.

In one embodiment, calls to predetermined numbers specified by the Supervisor, and time spent on calls from one or more numbers specified by the Supervisor, are not counted toward the total number of minutes permitted during the specified control period.

When a supervised user attempts to make a call during a period in which use is prohibited, a message may be played to the user indicating that the call will not go through at the specified time. Similarly, when a call is placed to a supervised user during a period in which wireless phone usage is prohibited, an audible message may be played to the calling party indicating that the phone is not accessible at the present time.

The Supervisor may also specify telephone numbers within the user profile that are never permitted to be connected to the respective user's phone, and the system will prevent calls from such numbers from being connected to the respective wireless phone. Additionally, the system may prevent the wireless phone from being used to call predetermined numbers specified by the Supervisor. The numbers telephone that cannot be called from the supervised phone and the telephone numbers of phones from which communications are blocked are referred to herein as never-accessible numbers.

If voicemail capability is enabled for the respective user's phone, voicemail messages from callers other than always-accessible callers may optionally be blocked during periods when phone use is restricted.

Certain numbers, namely the always accessible numbers, may be identified within the user profile and callers from these numbers may always access the supervised wireless phone or voicemail should the phone not be answered, even during a prohibited use period. For example, a parent's home number or wireless phone number may be included in the profile so that the parent is always able to reach the child's phone. In the event the child or wireless phone user is not available when a call from such a number comes in, the call may be forwarded to voicemail if voicemail is enabled for that user. An incoming call to a supervised phone is analyzed to determine if the calling number is one of the numbers on the list of always-accessible numbers. If the calling number is not one of the numbers on the always-accessible list, the call will not go through during a prohibited use period. However, a caller is provided the ability to access the supervised wireless phone upon dialing of a security code referred to herein as a cut-through code. Thus, the Supervisor, (or an individual having knowledge of the cut-through code) may access the supervised wireless phone when calling from a number other than one of the always-accessible numbers via the use of the cut-through code.

The user profiles are maintained within a database that may be modified at any time by the Supervisor. More specifically, the Supervisor can log in over a global communications network, or other network that permits remote access, and can change usage limits in real time, change, add, delete numbers that are always or never accessible to/by a particular supervised wireless phone, change restricted use times, and make all other permitted changes to the respective user profiles. To assure that changes to the respective user profiles managed by the Supervisor may be made only by the Supervisor, a security code is required to be entered and verified before permitting changes to be made to the managed user profiles under the respective Supervisor's control. The presently described supervisory functions may operate independent of billing controls such as real-time pre-paid billing controls, or post-paid billing systems, that may also be applicable to the respective supervised phone, although the information defining the restrictions on phone use may be stored in a separate database or a common database with billing parameters. Alternatively, the presently described functionality may be provided as an overlay to pre-paid billing controls or other call billing and control systems and may be configured to share resources with such other systems while exercising call control independently of such other systems. The presently described supervisory system may employ one or more servers that operate independent of servers that provide billing functionality, or alternatively, the presently described supervisory system may share server resources while exercising control independent of restrictions pertaining to billing functions.

Other aspects, features and advantages of the presently disclosed system for exercising supervisory control over wireless phone usage will be apparent from the Detailed Description of the Invention that follows.

BRIEF DESCRIPTION OF THE SEVERAL VIEWS OF THE DRAWINGS

The invention will be more fully understood by reference to the following detailed description of the invention in conjunction with the drawings, of which.

DETAILED DESCRIPTION OF THE INVENTION

U.S. provisional patent application Ser. No. 60/449,907, entitled "METHOD AND SYSTEM FOR EXERCISING SUPERVISORY CONTROL OVER WIRELESS PHONE USAGE", filed Feb. 25, 2003, is hereby incorporated herein by reference.

Figure 1:
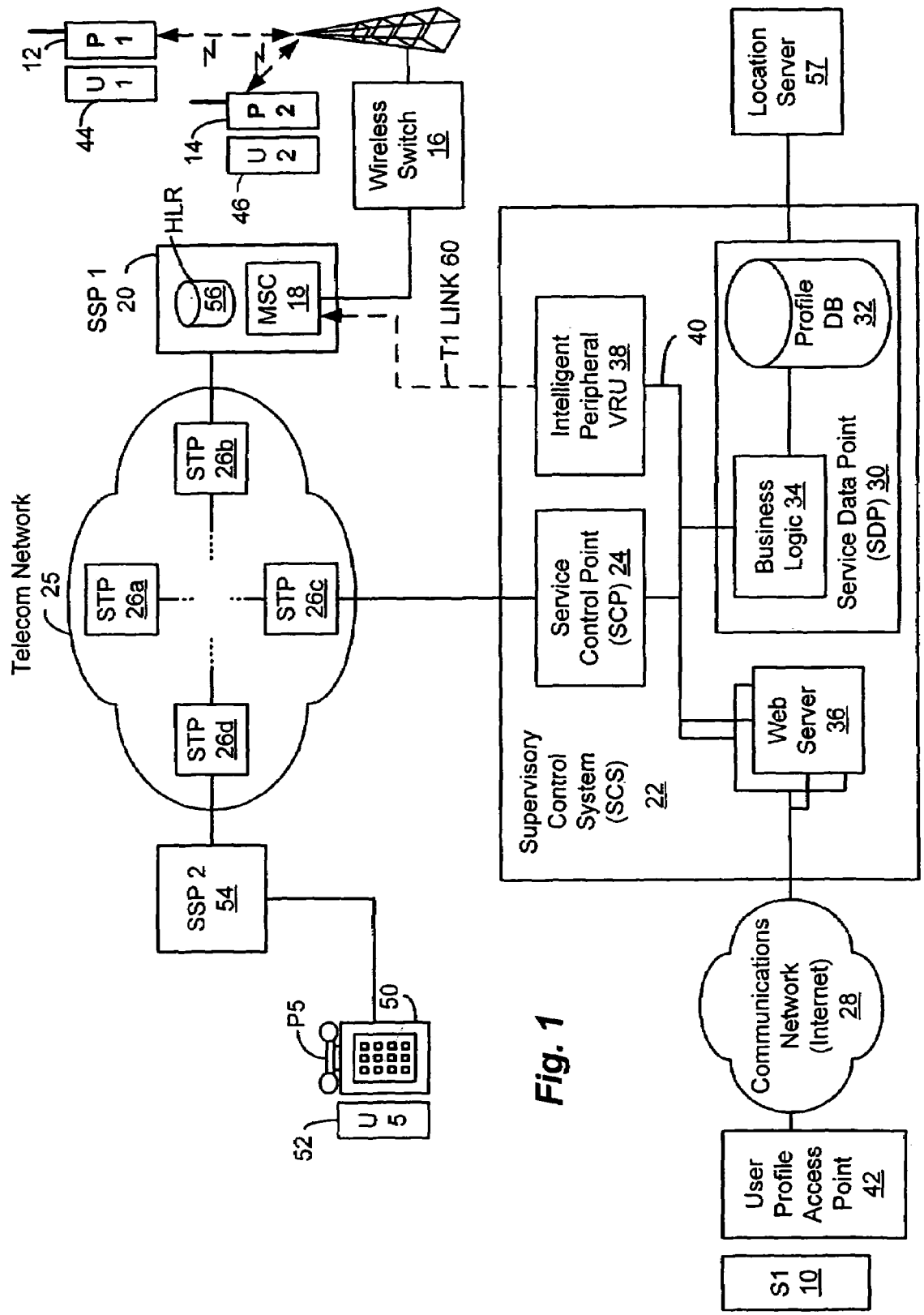
FIG. 1 is a block diagram depicting a system operative in accordance with the present invention.

In accordance with the present invention, a system and method for providing Supervisory control over wireless phone usage is disclosed. Referring to FIG. 1, a Supervisor S1 10, such as a parent or manager, is provided the ability to define a user profile for each of one or more users, such as children or employees. The user profile includes parameters and information that are used to manage phone usage. For example, the user profile may specify the total number of minutes the supervised phone may be used during a specified control period, the time of day and/or day of week when incoming and/or outgoing calls are prohibited, telephone numbers for numbers that are never accessible, and telephone numbers that are always accessible via the respective supervised phone, among other controlled characteristics.

Referring to FIG. 1, each wireless phone, shown for purposes of illustration as P1 12 and P2 14, may communicate with a wireless switch 16. For purposes of explanation, the wireless switch 16 in the illustrative embodiment may be a switch that is associated with a respective home serving system. The wireless switch 16 is communicably coupled to a Mobile Services Switching Center (MSC) 18 within a Service Switching Point SSP 1 20, which, in turn, is communicably coupled with the presently disclosed Supervisory Control System 22 via a telecommunications network 25 which typically includes a plurality of Signal Transfer Points (STPs) 26a, 26b, 26c, 26d, as known in the art.

The Supervisory Control System 22 includes a Service Control Point (SCP) 24 that communicates with the telecommunications network 25 and performs SS7 signaling, a Service Data Point (SDP) 30 that includes a User Profile Database 32 for storing a user profile associated with each supervised wireless phone subscribed to the presently disclosed service, and Business Logic 34 that serves as an intelligent interface between the SCP 24 and the User Profile Database 32. The Business Logic 34 typically comprises a computer that executes software to provide the supervisory processes herein described. The Supervisory Control System 22 further includes a Web-Server 36 that permits accounts to be established in the User Profile Database 32 and updated by Supervisor S1 10 as subsequently discussed. The Supervisory Control System 22 in the illustrated embodiment also includes a co-located Intelligent Peripheral or VRU 38 that is operative to play audible scripts in response to controls issued by the SDP 30. The VRU 38 may alternatively be located geographically proximate to the respective SSP 20 as is known in the art. The SCP 24, Web-Server 36, SDP 30 and VRU 38 in the illustrated embodiment are communicably coupled via a local area network (LAN) 40, such as an Ethernet or any other suitable network. The SCP 24 employs SS7 signaling over the telecommunications network 25 and the SDP 30 executes control software to implement the supervisory control functions herein described.

The Supervisor S1 10, operating through a PC, mobile phone or other Internet enabled access point 42 equipped with a suitable browser or micro-browser, may access the Web-Server 36 via the Internet 28 or another suitable network to establish and modify user profiles for the respective Users U1 44, U2 46.

Control and operation of the presently disclosed Supervisory Control System 22 falls within several areas of functionality, which are listed below:

1. Supervisory Control System service subscription and provisioning.
2. User profile configuration
3. Event control These functional capabilities are discussed in greater detail below.

1. Supervisory Control System Service Subscription and Provisioning

Further with reference to FIG. 1, the Supervisor S1 10 may create an Supervisory Control System account by accessing the Web-Server 36 within the Supervisory Control System 22 via the Access point 42 or alternatively, by calling a service representative who enters the applicable account information. A supervisory account identifier is associated with the respective Supervisory Control System account and stored in the User Profile Database 32. Account setup includes the following three functions:

1. provisioning the Supervisory Control System account within the wireless network;
2. provisioning the Supervisory Control System account within the billing system so that appropriate charges will be applied with respect to each wireless supervised phone; and
3. establishing applicable Supervisory Control System parameters for each supervised wireless phone.

More specifically, when creating a Supervisory Control System account via a graphical user interface provided through the Web-Server 36, the Supervisor S1 10 may employ a browser resident on the access point 42 to access Web pages served by the Web-Server 36 within the Supervisory Control System 22 or alternatively, the Supervisor S1 10 may place a voice call to a service representative who enters applicable Supervisory Control System account information.

When creating a Supervisory Control System account via the Internet, the Web-Server 36 is accessed via a domain-name associated with a carrier and linked to the respective Web-Server 36. The interface provided by the Web-Server 36 guides the Supervisor S1 10 through the necessary steps to establish a Supervisory Control System account via one or more interface screens served by the Web-Server 36. Any suitable format for interface screens may be used as is appropriate for a given implementation, so long as the interface allows the Supervisor S1 10 to establish a Supervisory Control System account and to enter User Profile data applicable to one or more supervised phones.

After accessing the Web-Server 36, the Supervisor S1 10 may log in via the access point 42 using a conventional login registration process. During this login process, the Supervisor S1 10 typically provides a user name and an email address. In response, the Web-Server 36 emails a pass code to the specified email address. The Supervisor S1 10 then enters the pass code into an interface screen served by the Web-Server 36 to confirm that the Supervisory Control System account is associated with the proper individual. The supervisory account identifier is associated with the Supervisory Control System account established by the Supervisor.

2. User Profile Configuration

Following the creation of a Supervisory Control System account as described above, the phones to be supervised through the account, are identified to the SSP 1 20 so that a determination can be made whether calls relating to such phones should be processed by the Supervisory Control System 22. Accordingly, the Supervisor S1 10 is requested by the Web-Server 36 to enter a logical phone identifier (which is referred to herein as a Mobile Station Identifier (MSID)) and the Electronic Serial Number (ESN) for each wireless phone in the Supervisory Control System account. The specific Mobile Station Identifier employed may vary from system to system. For example, the MSID may be a Mobile Directory Number (MDN), a Mobile Identification Number (MIN), an International Mobile Subscriber Identity (IMSI) or a Mobile Subscriber International Services Directory Number (MSISDN) or any other suitable phone identifier. In the illustrative example, the MSID and the ESN for wireless phones P1 12 and P2 14 shown in FIG. 1, that are to be supervised by the respective Supervisor S1 10, are associated with the Supervisory Control System account. The Supervisor S1 10 also associates the name of each user with the applicable identifier(s) for the respective wireless phones. For example, in the illustrative configuration shown in FIG. 1, the Supervisor S1 10 would enter the name of User 1 U1 44 in association with wireless phone P1 12, and the name of User 2 U2 in association with wireless phone P2 14. An MSID is used to identify the wireless phone during call processing. As indicated above, the MSID used may vary from system to system and additionally at different points within a given system.

Information and parameters defining restrictions or permissive conditions for each supervised user's phone are stored in the User Profile Database 32. The parameters are employed to control the use of the respective wireless phone or to establish conditions that define when alert or warning messages should be provided with respect to the usage of the supervised phone.

Following the association of the applicable identifier(s) with the respective users, the Web-Server 36 steps the Supervisor S1 10 through a configuration sequence for each user having a phone to be supervised through the Supervisory Control System account. During this process, the Web-Server 36 presents the terms and conditions applicable to the service and requests that the Supervisor S1 10 accept the terms and agree to payment of a predetermined monthly fee for each wireless phone that is subject to control of the Supervisory Control System 22.

The Supervisor S1 10 also enters user profile data to be stored within the User Profile Database 32. The user profile data specifies how the respective wireless phone may be used and characteristics associated with such usage. The user profile data may impose restrictions on the use of a phone associated with the user profile data or, alternatively, may specify that warnings and/or alerts regarding phone usage are to be provided to the User or Supervisor S1 10 without restricting phone use. Such warnings or alerts may indicate that usage restrictions are in effect or provide alerts that pertain to the amount of phone usage.

The user profile data described below corresponds to the data that may be entered for a single user. It should be recognized that the same process is repeated for each user specified by the Supervisor S1 10 within the Supervisory Control System account.

By way of example, and not limitation, the Supervisor S1 10 enters the following information from the access point 42 via a browser interface in response to prompts by the Web-Server 36.

3. Event Control

3a. Overall Usage Limits

The Supervisor S1 10 may optionally specify an overall usage limit for a respective user. The overall usage limit specifies the number of minutes that the wireless phone associated with that user may be used within a predetermined control period, such as a week, a month or any other suitable interval. For example, the predetermined control period may correspond to a weekly or monthly period specified by the Supervisor S1 10, a billing period, or a calendar month, and may be revised from time to time by the Supervisor S1 10 via the Web-Server 36 interface or through a service representative who updates the User Profile Database 32. Once the user of a supervised phone uses a number of minutes equal to the overall usage limit allotted for the control period, no further incoming or outgoing calls are permitted until the next control period, except for calls to or from always-accessible numbers as discussed below. If the usage limit is set to 0 minutes, the phone will only be usable for calls to/from always-accessible numbers that are defined by the Supervisor S1 10. As an exception to the restrictions discussed in the preceding two sentences, in the case of an incoming call that is placed to a restricted phone using a valid cut-through code as described below, the call is connected and in one embodiment, the call time associated with such a call is not assessed against the user's usage limit.

In one embodiment, the time on calls to or from the always-accessible numbers are not applied against the overall usage limit. For example, it may be desirable for a child to be able to call or be called by a parent without exhaustion of the overall usage limit established by the parent. In such event, the Supervisor (parent) may establish a usage limit and calls made to or from the parent are not applied against the overall usage limit.

3b. Warning Messages and Tones

Even if the Supervisor S1 10 does not establish an overall usage limit for a respective user, the Supervisor S1 10 may optionally enter an indication in the user profile information that warnings or alerts regarding phone usage should be provided to the user or supervisor after one or more usage thresholds are reached. For example, the Supervisor may specify in the User Profile Database 32 that usage alerts are to be provided after a predetermined number of minutes and at subsequent intervals. The Supervisory Control System 22 maintains a value reflective of the cumulative usage of the wireless device within the control period. From time to time the Supervisory Control System 22 determines whether the cumulative usage of the wireless device has reached the interval value specified by the Supervisor at which usage alerts are to be provided. During a call, such usage alert may, for example, be provided to the user in the form of a predetermined tone. Pre-call or post-call audible warning messages to a subscribed user may be injected as an audible script as discussed herein via the VRU 38 or alternatively as text messages via a data bearer service to advise the user of the alert condition.

Additionally, alerts may be generated and forwarded to the Supervisor regarding the usage of the supervised phone at periodic usage intervals. More specifically, the Supervisor may specify a usage interval at which alerts are to be generated and store a value corresponding to the usage interval in the User Profile Database in association with an identifier of the supervised wireless phone. The Supervisory Control System 22 may then determine when the cumulative usage of the wireless device within a control period equals the usage interval specified by the Supervisor or is an integral multiple of the time interval specified by the Supervisor. An alert message may be generated and forwarded to the Supervisor when the cumulative usage of the wireless phone equals the time interval specified by the Supervisor or is an integral multiple of the specified time interval or at any times specified by the Supervisor. The alert may be forwarded to the Supervisor as an audible script, by a text messaging service or alternatively, via email delivery. When forwarding an alert to the Supervisor as an audible script, the message may be communicated to a telephone number specified by the Supervisor and stored in the User Profile Database 32 in association with an identifier for the wireless phone. When forwarding an alert message to the Supervisor as a text message, the text message may be forwarded to the Supervisor at a telephone number specified by the Supervisor and stored in the User Profile Database 32 in association with the wireless phone identifier. When forwarding the alert message to an email address, the message may be forwarded to an email address specified by the Supervisor and stored in the User Profile Database 32 in association with the wireless phone identifier. The alert message may also be communicated to the Supervisory account by the Web Server 36 and accessed by the Supervisor either at the Access Point 42 or via a personal computer, mobile phone, or personal digital assistant (PDA) having access to the Web Server 36. At the beginning of each control period (e.g. each month) the value maintained by the Supervisory Control System 22 pertaining to the cumulative usage of the wireless phone may be reset to reflect no usage of the wireless phone within the new control period.

The above-described alerts may be forwarded to the Supervisor and/or User with or without the imposition of restrictions on the use of the supervised phone.

3c. Permitted/Non-Permitted Usage Periods

Within the user profile data, the Supervisor S1 10 may specify time periods during which general phone use is permitted or not permitted. Whether an embodiment of the disclosed system provides for the specification of prohibited usage times or permitted usage times is a matter of design choice.

By way of example, and with reference to FIG. 1, within the user profile data, the Supervisor S1 10 may specify that User U1 44, who for purposes of illustration is assumed to be a young child, is not permitted to use the supervised wireless phone P1 12 for general usage calls other than between 4 pm and 8 pm on weekdays and between 9 am and 8 pm on weekends and holidays.

If the overall general usage limit for the specified control period is set to 0 minutes for a particular supervised phone, the system permits calls only to and from always accessible numbers and additionally, calls to the supervised phone using a valid cut-through code as discussed below.

3d. Location Controls

Also within the user profile data, the Supervisor S1 10 may specify one or more geographic locations or geographic areas within which general phone use is permitted or not permitted. Whether an embodiment of the disclosed system provides for the specification of prohibited usage locations or geographic areas, or permitted usage locations or geographic areas, is a matter of design choice. The Supervisor may specify the geographic location as a street address and a converter or conversion service, as known in the art, may be employed to resolve the street address into a set of coordinates in a predetermined coordinate system. For example, the street address specified by the Supervisor may be stored in the User Profile Database 32 and converted into latitude and longitude coordinates prior to use. Following conversion of the street address into coordinates represented within the specified coordinate system, the coordinates may be stored within the User Profile Database so that the conversion need not be performed each time a call to or from the respective wireless device is made.

The location of the phone is generated using a global positioning system, cell sector identifiers or any other suitable technique for generating coordinates defining the location of the phone. More specifically, cell sector identifiers may be employed to resolve the geographic location of the wireless phone. The function of determining the geographic location of a wireless phone is performed via the use of a location server 57, also known as a location service broker. Such services are commercially available. One company that offers location service broker services is Apertio Limited, Kingswood, Bristol, United Kingdom and such services are described at www.invergence.co.uk. More specifically, the location service broker is operative to convert cell sector identifiers into a coordinate system such as latitude and longitude for subsequent use.

Alternatively, location information regarding the current location of the supervised wireless phone P1 12 may be obtained through the use of a GPS (Global Positioning System) receiver disposed within the wireless phone.

After determination of the geographic location of the phone, the location of the wireless phone is compared to the geographic location specified in the User Profile Database 32 to determine if a call should proceed. More specifically, the Supervisor may specify a distance between the location specified in the User Profile Database and the location of the wireless phone within which the location of the wireless phone is deemed to correspond to the location specified by Supervisor. If the location of the wireless phone corresponds to at least one location specified by the Supervisor within the User Profile Database 32, the call may be permitted to be completed or the connection of the call may be prevented based upon the parameters specified by the Supervisor in the User Profile Database 32 in the event of such a correspondence. By way of example, and with reference to FIG. 1, within the user profile data, the Supervisor S1 10 may specify that User U1 44, who for purposes of illustration is assumed to be a young child, is not permitted to use the supervised wireless phone P1 12 for general usage calls when the phone is generally within the geographic area defined by the school grounds of User U1 44.

Any appropriate technique for definition of such a restricted area may be used. For example, an indication of a restricted address, combined with the radius of the area to be considered restricted around that address, may be entered by the Supervisor S1 10 into the user profile data to provide the restricted area definition.

The present system may be embodied to allow the definition of restricted or permitted phone use locations for incoming calls, outgoing calls, or both.

i. Use of Cell Sector Identifiers

The Supervisory Control System 22, in one embodiment, obtains cell sector identifiers and uses the cell sector identifiers alone or in combination with associated signal strength information to obtain the location coordinates of the wireless phone. More specifically, the wireless phone has access to the received radio signal transmission strength at the mobile station radio transceiver (P1, P2). A processor on the wireless phone may execute a script or application that enables the wireless phone to calculate, extract and transmit signal strength measurements to the network via a non-displayable SMS message or via any other suitable protocol. The signal strength data is coupled with the cell sector identifier information and the location area code that may be obtained from the home location register (HLR) 56. The signal strength and cell sector identifier information may then be forwarded to the location server 57 to calculate coordinates of the mobile station. The location server 57 may generate coordinates using the cell sector identifiers alone or in combination with the signal strength information to resolve the wireless phone coordinates with greater accuracy. In particular, the Supervisory Control System 22 communicates the cell sector identifiers and optionally the signal strength information to the commercially available service provider, such as the location server 57, to map cell sector identifiers and signal strength data into coordinates that identify the location of the wireless phone. The location server may also be employed to map street address or address information entered in the Profile Database by the Supervisor into coordinates that are returned to the Supervisory Control System 22.

It should be recognized that the mapping of street address information to latitude and longitude information may also be performed by the Supervisory Control System 22. In the circumstance in which the mapping is performed by the Supervisory Control System 22, the Supervisory Control System 22 would include the location server 57 functionality.

The Supervisory Control System may include a program that inspects the HLR 56 at specific time intervals, obtains or derives the latitude and longitude of the supervised phone at each such time, and arithmetically derives a speed of the supervised phone based upon the location information and the time interval. A speed threshold may be stored by the Supervisor in the User Profile Database 32. If the speed threshold is exceeded, a program within the Supervisory Control System may take such actions as are specified by the Supervisor. For example, the Supervisory Control System may be programmed to forward to the Supervisor S1 10 an audible message communicated to a telephone number specified by the Supervisor, a text message via a data bearer service (such as SMS messaging), or an email message that includes an alert that the respective supervised phone has been detected as having exceeded the specified speed threshold. Additionally, the Supervisory Control System may be programmed to communicate a notice to the Supervisor S1 10 via the Web Server 36 that is posted in association with the Supervisory account and accessible by the Supervisor. Moreover, the Supervisory Control System 22 may be programmed to prevent further incoming or outgoing calls or to terminate any call in progress at the time of the detection of the excessive speed condition.

In the event of an outgoing call by a supervised phone, the network inspects the HLR and identifies the telephone as one being managed by the Supervisory Control System 22. This determination may be made based upon the telephone number of the calling party or any other suitable phone identifier. In response to the determination that the phone associated with the respective phone identifier is managed by the Supervisory Control System 22, the network passes call control to the Supervisory Control System 22. The Supervisory Control System 22 looks up the user profile in the User Profile Database 32 for the calling party. Upon ascertaining that there is a location restriction on phone use, the Supervisory Control System 22 sends an inquiry to the HLR to ascertain the location of the calling party. The HLR returns to the Supervisory Control System 22 the cell sector identifier associated with the calling party. In one embodiment the Supervisory Control System 22 obtains coordinates of the wireless phone using the location server 57 and determines whether the coordinates of the wireless phone correspond to the coordinates corresponding to the address entered into the User Profile Database by the Supervisor.

In another embodiment, the Supervisory Control System 22 compares the cell sector identifier associated with the calling party with the locations identified in the User Profile Database 32. More specifically, using a location server, the addresses entered by the Supervisor are mapped into cell sector identifiers. If the cell sector identifier of the calling party's phone corresponds to a restricted cell sector identifer identified in the User Profile Database 32, the Supervisory Control System 22 provides appropriate signaling to the control network to prevent the call from being connected. It should be appreciated that if the cell sector identifier of the calling phone is forwarded to the Supervisory Control System 22 along with the request for service by the Supervisory Control System 22 a subsequent request for the cell sector identifier can be avoided.

When a call is placed to a supervised phone, the network inspects the HLR and identifies the supervised phone as one that is managed by the Supervisory Control System 32. In response to this determination, call control is passed to the Supervisory Control System 22. The Supervisory Control System 22 looks up the user profile in the User Profile Database 32 for the called party. Upon ascertaining that there is a location restriction on phone use, the Supervisory Control System 22 sends an inquiry to the HLR to ascertain the location of the called party. The HLR returns to the Supervisory Control System 22 the cell sector identifier(s) associated with the called party and optionally signal strength information associated with each of the cell sector identifiers as discussed above. The Supervisory Control System 22 then compares the location of the wireless phone to the location specified in the User Profile Database 32. This comparison may involve a comparison of coordinates after resolving the cell sector identifier data into coordinates or alternatively a comparison of cell sector identifiers to determine if the wireless phone is at a location that corresponds to a location specified by the Supervisor in the User Profile Database 32. The Supervisory Control System 22 provides appropriate signaling to the control network to either permit the call to be connected or to prevent the call from being connected based upon the result of the comparison. It should be noted that if the cell sector identifier of the wireless phone is forwarded to the Supervisory Control System 22 along with the request for service by the Supervisory Control System 22 a subsequent request for the cell sector identifier can be avoided.

ii. Use of GPS Coordinates

Alternatively, GPS coordinates may be employed to provide restrictions on phone use for a supervised phone. As discussed above, the Supervisor S1 10 enters into the User Profile Database 32 a physical address or the identification of a location at which the phone use is restricted or permitted, as applicable. The physical address, street address or identification entered into the User Profile Database 32 by the Supervisor S1 10 is converted into coordinates. More specifically, a converter accepts input information in the form entered by the Supervisor and converts such information into coordinates defining the location of the wireless phone. In the instant example, it is assumed that the Supervisor has entered into the User Profile Database 32 an address at which the use of the supervised phone is restricted.

The Supervisory Control System 22 accesses the location server 57 to obtain the geographic coordinates (latitude, longitude description) corresponding to the restricted/permitted use location specified by the Supervisor as an address. The geographic area in which the use of the wireless phone is restricted may be represented by a set of coordinates defining boundaries, as a mathematical description, as a set of coordinates and a radius defining a circular area, or any other suitable way of describing the geographic area within which the phone use is restricted or permitted. While the presently illustrated embodiment utilizes latitude and longitude coordinates to identify the geographic area of interest, any other suitable coordinate system may be employed. The Supervisory Control System 22 stores the coordinates or mathematical description defining the geographic location in which the use of the wireless phone is restricted.

In one embodiment, the location of the wireless phone is deemed to be at the location specified in the User Profile Database, if the coordinates of the wireless phone are within a specified distance of the coordinates corresponding to an address specified in the User Profile Database 32. The specified distance may be input by the Supervisor S1 10 and stored in the User Profile Database 32 or a default distance may be specified which may be modified by the Supervisor S1 10.

In response to an outgoing call from a managed phone, the HLR associated with the wireless phone identifies the phone as one that is serviced by the Supervisory Control System 22 and passes control to the Supervisory Control System 22. The Supervisory Control System 22 inspects the User Profile Database 32 and identifies the calling phone as one that has one or more restrictions involving locations of use. The Supervisory Control System initiates a network query to obtain GPS coordinates of the handset which are provided by a GPS receiver contained within the wireless phone. The network query may comprise a query of the wireless phone or any other network element having access to the GPS coordinates of the wireless phone. In response to the network query, the GPS coordinates of the supervised phone are returned to the Supervisory Control System 22.

The coordinates of the wireless phone are then compared by the Supervisory Control System 22 to the restricted area as specified within the User Profile Database 32 to determine to the wireless phone coordinates are within a restricted area. If the coordinates of the wireless phone are within the restricted area, the Supervisory Control System 22 prevents the call from being connected.

Additionally, the Supervisory Control System 22 may include a program that permits the wireless phone or the network to be queried to ascertain the physical location of the phone in response to the receipt of a control code such as "*" or any other suitable control code entered on the keypad of the wireless phone by the supervised user. Alternatively, the Supervisory Control System 22 may initiate a query to ascertain the location of the supervised phone in response to an inquiry initiated by the Supervisor S1 10. Additionally, the Supervisor may initiate a query to ascertain the location of the wireless phone for one of the supervised Users. The request from the Supervisor may be communicated to the Supervisory Control System 22 from the Supervisor's phone, from the Access Point 42 via the Web Server 36 or via any other communication path. Location information responsive to a request initiated either by the supervised user or the Supervisor may be communicated to the Supervisor audibly via a script played by the VRU 38 to the Supervised User's phone, via text messaging or via email. Prior to communication of the location of the wireless phone to the Supervisor S1 10, a conversion of the wireless phone coordinate data to an address may be performed and address information may be conveyed to the Supervisor instead of coordinate data.

In the circumstance of an incoming call to a supervised phone, a determination is made whether the call may be completed as discussed above.

It should be recognized that if the coordinates of the supervised phone are provided along with the request for service by the Supervisory Control System 22, the network query can be avoided.

iii. Combinations of Restrictions or Permissive Use

The location information obtained via a GPS receiver disposed in the wireless phone, or a system that resolves the wireless phone location using cell sector identifiers, may be employed in conjunction with other restrictions and/or permissions to determine whether a call placed to or from the wireless phone should be connected. For example, Boolean functions of restrictions and/or permissions described herein and the location information may be generated to determine whether a call should be connected or blocked. More specifically, a location restriction may be employed in conjunction with a time period restriction to prevent the wireless phone from being used for normal calls while a child is at school and during the normal school hours of 9 am to 3 pm. Thus, the child could make and receive calls while at school before and after the normal school day or while away from the school. Similarly, location restrictions may be employed in conjunction with one or more lists of always accessible numbers and/or one or more lists of never accessible numbers to allow or disallow calls to/from specific numbers based upon the location of the supervised wireless phone and the telephone numbers on the lists of always accessible numbers and/or never accessible numbers as applicable. Finally, a determination may be made by the Supervisory Control System 22 whether to complete or block a call based upon a combination of one or more of the wireless phone location, always accessible or never accessible numbers, date, day or the week and/or a permitted or restricted time period.

While the restrictions and/or permissions regarding phone usage are entered by the Supervisor S1 10 into the User Profile Database 32 for the respective wireless phone, information representative of the location information stored in the User Profile Database may be downloaded from the User Profile Database 32 to a first memory region within the wireless phone and a determination may be made within the wireless phone whether to connect a call dialed by the wireless phone user based upon a comparison of the downloaded information to location information generated within the wireless phone. Such a determination may be made using a processor within the wireless phone that executes a software program stored in a second memory region within the phone. The first and second memory regions may be within the same physical memory or different physical memories within the wireless phone. For example, if a supervisor has entered into the respective User Profile Database 32 a restriction on phone use that indicates that the wireless phone may not be used when a student is at school between 9 am and 3 pm, a determination may be made by the processor within the wireless phone whether the phone is at the restricted location and whether the current time is within the specified time period, in which event the call may be blocked. By making such a determination within the wireless phone rather than at the Supervisory Control System 22, unnecessary network traffic is avoided. It should be recognized that the location information stored within the User Profile Database 32 may comprise conventional street address information which may be converted to latitude and longitude coordinates prior to communication to the wireless phone. Thus, a comparison of the latitude and longitude coordinates corresponding to the street address entered by the Supervisor S1 10 may be made with respect to the latitude and longitude coordinates obtained from a GPS receiver disposed within the wireless phone and a determination may be made that the wireless phone is at the address specified by the Supervisor if a distance between a location specified by the latitude and longitude associated with the street address and a location specified by the latitude and longitude obtained from a GPS receiver within the wireless phone is less than a predetermined threshold distance. If the wireless phone is determined to be at the address specified in the User Profile Database 32, the call may be terminated or connected as specified by applicable rules maintained within the User Profile Database 32.

3e. Cut-Through Capability

A Supervisor or other individual that desires to call a supervised user's phone (assuming the phone is on and not otherwise in use), may always reach the user's phone provided that a cut-through code has been established for the respective Supervisor or entered by the Supervisor. More specifically, in one embodiment, in response to prompting by the Web-Server 36, the Supervisor S1 10 may provide a cut-through code that is typically defined as being between n and m numerical characters in length. For example a numeric code between 4 and 6 characters in length may be employed. The cut-through code allows the Supervisor S1 10 to access one or more of the supervised phone(s) during hours or under circumstances in which phone usage is restricted and when the Supervisor S1 10 is not located at an always-accessible number. The cut-through code is communicated from the access point 42 to the web server 36 via the communications network 28. The web server communicates the cut-through code over a data path to the User Profile Database 32 for storage. The data path may include a computer that forms a component of the business logic 34 and that writes the cut-through code to the User Profile Database 32.

In one embodiment, as a default, the cut-through code is assigned based upon the Supervisor's user name that is communicated from the access point to the User Profile Database 32. For example if the Supervisor's user name is "abcdef" the cut-through code would be "222333" which represent the number keys on a typical phone keypad that correspond to the letters in the username. If the username were "222333", the cut-through code would be "222333". By way of further example, if the username were "abc444", the cut-through code would be "222444". If the username were more than six characters in length, the cut-through code may be truncated at a predetermined number of characters, such as at six characters. By using the username as the default cut-through code, the necessity to have the Supervisor input this code is avoided. The Supervisor may be permitted to modify the default cut-through code to specify a different cut-through code to provide higher security.

The Supervisor may also convey the cut-through code to an administrator orally and the administrator may input the cut-through code to the Supervisory Control System 32.

When a Supervisor having knowledge of the cut-through code calls a supervised phone at a time when the use of the phone is subject to a restriction on use, a message is played to the calling party (the Supervisor) that indicates that the called phone is not accessible. If the Supervisor successfully enters the cut-through code before a predetermined time interval expires, the call is allowed to proceed. If the cut-through code is not entered within the predetermined time interval, the call is blocked. If the call is allowed to proceed, a control message of a first type is forwarded to the control network to signal that the call should be connected. If the call is not to be connected, a control message of a second type is forwarded to the control network to prevent the call from being connected.

The "cut-through" capability may be tested during the user profile data setup. At such time, the Supervisor S1 10 may have physical possession of the phones controlled under the Supervisory Control System account before the phones have been distributed to their users. More specifically, in response to prompting from the Web-Server 36, the Supervisor S1 10 powers on the respective user's phone, which is subject to at least one use restriction, and attempts to call it. When the Supervisor S1 10 hears a prompt advising that the phone is not presently reachable, the Supervisor S1 10 enters the previously selected cut-through code. If the cut-through capability is functioning properly, the respective user's phone rings as a result of the entry of the cut-through code.

3f. Always-Accessible Numbers

In response to a prompt from the Web-Server 36, the Supervisor S1 10 may optionally enter a first list of telephone numbers that may always be called by the respective user and a second list of numbers that may always call the respective user's phone number assuming the wireless phone is powered on and reachable within the wireless network. These lists may be provided as separate lists or alternatively, may be aggregated as a single list. Optionally, the Supervisor S1 10 may enter or associate within the user profile data short codes that correspond to the always-accessible numbers so that one or more of the always-accessible numbers can be rapidly called in an emergency situation without the need for a user to remember the numbers.

3g. Never-Accessible Numbers

In response to a prompt from the Web-Server 36, the Supervisor S1 10 may optionally enter a list comprising one or more telephone numbers or telephone number prefixes that the user of an associated phone should never be able to call and a list of telephone numbers or telephone number prefixes that should never be able to call the supervised user's phone. These lists may be entered as separate lists or alternatively may be aggregated as a single list.

3h. Saving of User Profile Data

When the Supervisor S1 10 initiates the saving of the user profile data, that data is associated with the respective user. If the Supervisor S1 10 exits the setup routine without saving the user profile data, the respective wireless number is provisioned within the Supervisory Control System 22 for unrestricted use.

3i. Setup of Additional Users

The Web-Server 36 may prompt the Supervisor S1 10 to determine whether he/she desires to utilize the same user profile data for the next user that needs to be configured. The Supervisor S1 10 may apply the previously entered user profile data for the setup or the next user or alternatively, establish a new user profile for the next user. Moreover, as further discussed below, user profiles may be defined and modified on a user group basis. Under such circumstances, the disclosed system enables the Supervisor S1 10 to define a set of user profile parameters that apply to a group of phones and associated users. The control parameters for the group can subsequently be modified and members of the group added or deleted.

4. Supervisory Control System Operation

4a. Supervisory Control System Operation for Incoming Calls to a User

Operation and signaling for the Supervisory Control System 22 with respect to a telephone call that is placed to a user is described below with respect to the devices in FIG. 1 and the steps shown in FIG. 3.

The following example describes an exemplary call from a calling party U5 52 from a telephone P5 50 to a called party U2 46 at a supervised wireless phone P2 14. It is assumed for purposes of the present discussion that Supervisor S1 10 established a user profile applicable to phone P2 14 at a prior time and that the user profile for the phone P2 14 prohibits general phone usage during school hours from 8:00 am to 4:00 pm weekdays.

Figure 3:
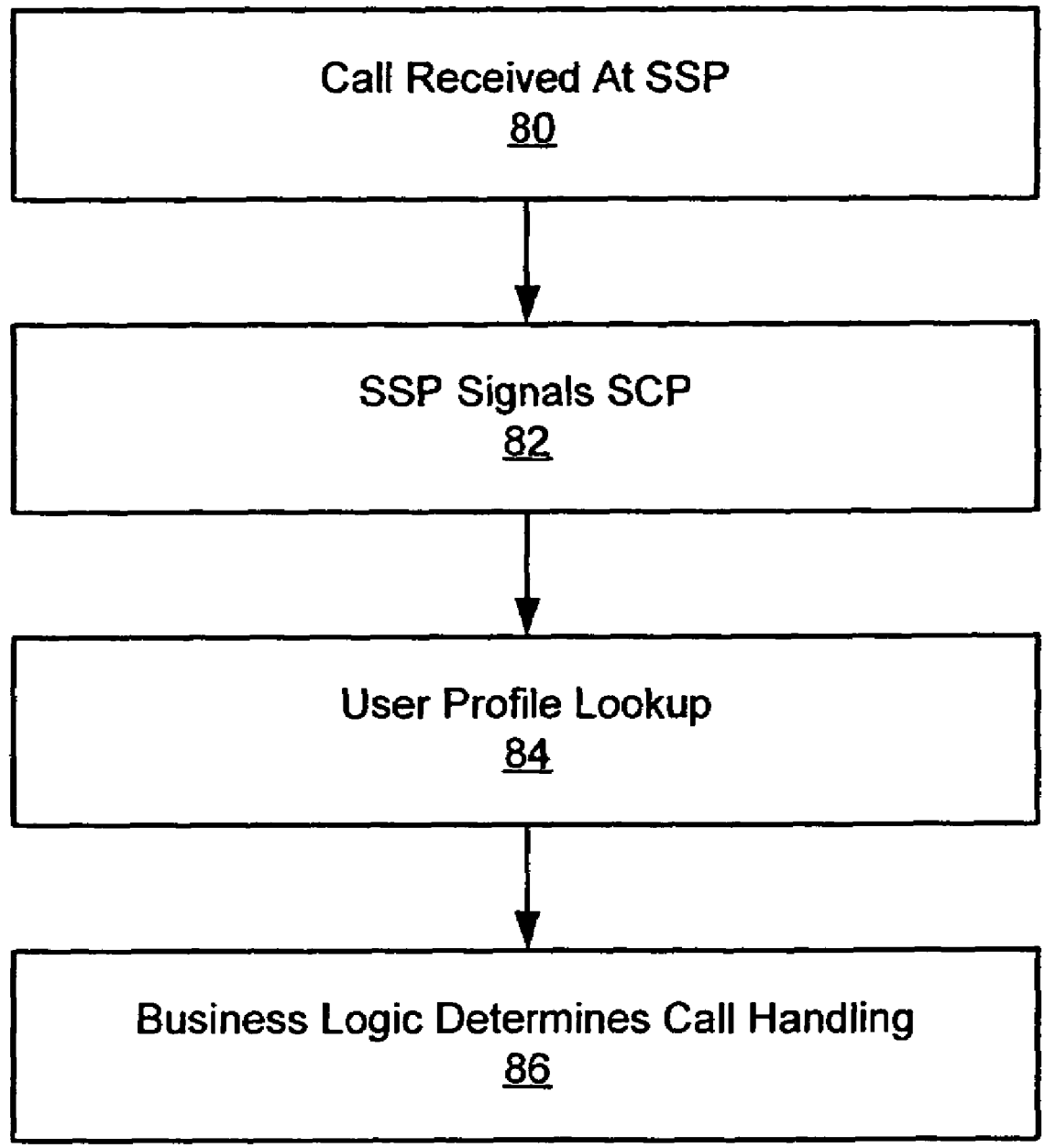
FIG. 3 is a flow chart depicting the processing of incoming calls.

The call placed by caller U5 52 from phone P5 50 is received at an associated Signal Switching Point (SSP 2) 54 as depicted at step 80 of FIG. 3. The Signal Switching Point (SSP 2) 54 accesses the Dialed Number Identification Service (DNIS) which includes the dialed telephone number for the call. From the DNIS, the SSP identifies the service provider for the dialed phone number and routes the call to the applicable service provider. In the instant example, the call is routed to SSP 1 20 which is within the home serving system for the wireless phone P2 14.

The SSP 1 20 within the home serving system for the called number extracts a MSID from the DNIS. The SSP 1 20 performs a lookup within the Home Location Register (HLR) 56 using the extracted identifier to obtain the HLR record for the respective called wireless phone P2. The HLR record includes data that instructs the respective Signal Switching Point (SSP 1) 20 what to do next. If the HLR record indicates that the Supervisory Control System 22 should be accessed in the event of calls to the respective called party, the Supervisory Control System 22 is signaled. If the HLR 56 does not indicate that the Supervisory Control System 22 should be accessed, the call is connected subject to any other restrictions and protocols that may be applicable.

In the instant example, the HLR record includes information that instructs the SSP 1 to signal the Supervisory Control System 22 that an incoming call is pending. More specifically, as depicted at step 82 of FIG. 3, the respective SSP (SSP 1) 20 signals the SCP 24 within the Supervisory Control System 22 that an incoming call is pending for a called party having a specified MSID. The Service Data Point (SDP) 30 within the Supervisory Control System 22 performs a lookup within the User Profile Database 32 as depicted at step 84 of FIG. 3 to ascertain whether the MSID corresponds to a user profile within the User Profile Database. If as a consequence of the lookup, it is determined that the MSID corresponds to an MSID within the User Profile Database 32, the Business Logic 34 executes a software program as shown at step 86 of FIG. 3 to determine how the call should be handled. As a result of the Business Logic 34 processing, the SCP 24 may be instructed to initiate SS7 signaling and a VRU such as VRU 38 may be instructed to play an audible script to a supervised phone or a calling party. More specifically, if the MSID of the called party corresponds to the MSID of a phone within the User Profile Database 32, the Business Logic 34 within the SDP 30 accesses the relevant data within the applicable records of the User Profile Database 32, current conditions, such as time, date, calling number, and called number and determines what action should be taken. Exemplary Supervisory Control System processing under the control of the Business Logic 34 is described below with reference to FIG. 4.

Figure 4:
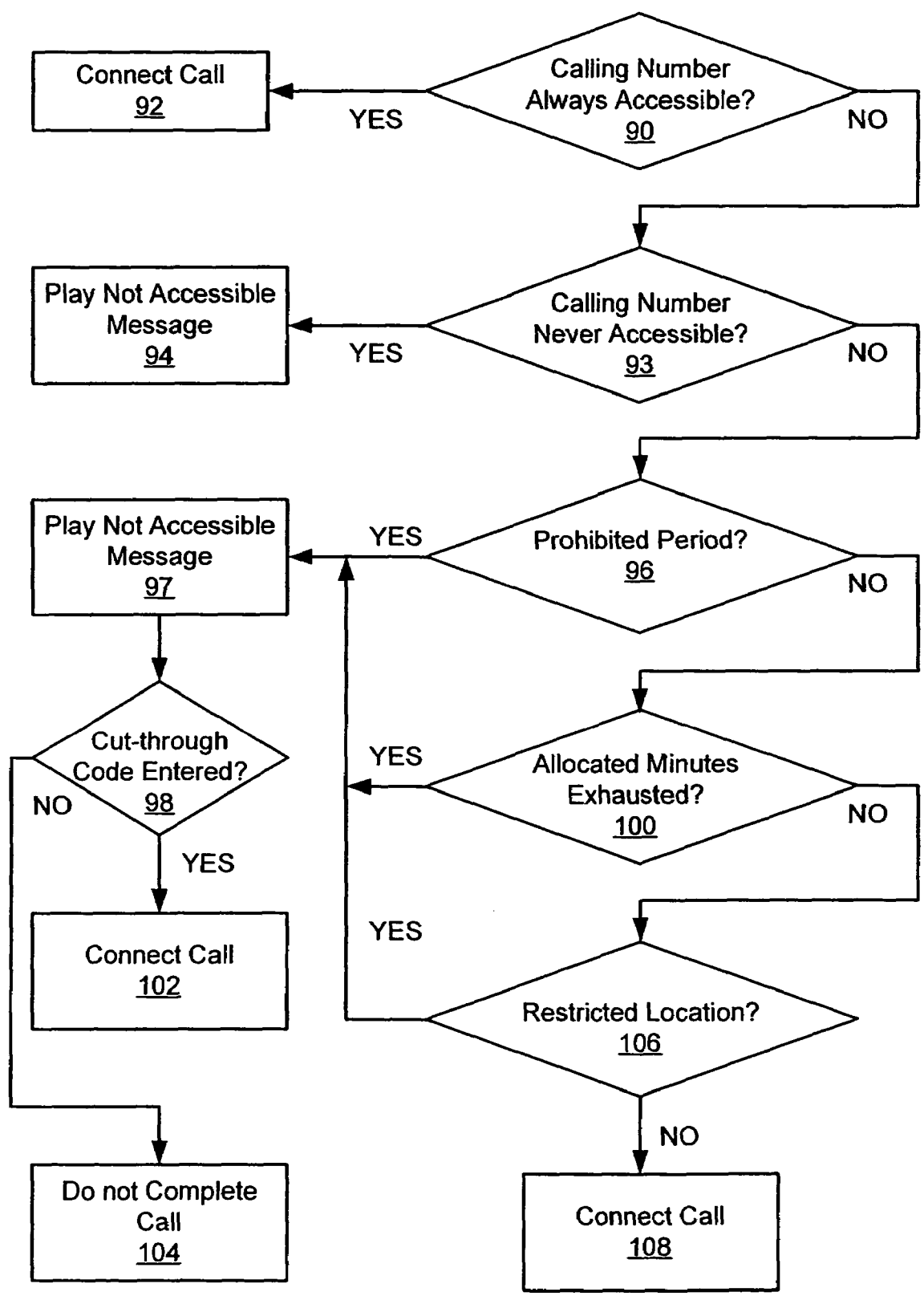
FIG. 4 is a flow chart depicting the processing of incoming calls.

As depicted at step 90 of FIG. 4, the Business Logic 34 determines at step 90 of FIG. 4 whether the calling number corresponds to an always-accessible telephone number that can always be put through to the supervised phone P2 14. If the calling number corresponds to a telephone number that is specified in the User Profile Database 32 as being an always-accessible number that can always access phone P2

14, the SCP 24 within the Supervisory Control System 22 signals the SSP 1 20 associated with the phone P2 14 (in the instant example SSP 1 20) to allow the call to be connected to the phone P2 14 as indicated at step 92. In response, the call is routed through the MSC 18 in SSP 1 20 to P2 14 to establish the desired connection between P5 52 and the supervised wireless phone P2 14.

If the Business Logic 34 determines, as depicted at step 90, that the calling number does not correspond to a number that can always access the respective phone P2 14, the Business Logic 34 next determines whether the calling number corresponds to a number that is identified within the User Profile Database 32 as never being permitted to access the phone P2 14 as depicted at step 93 of FIG. 4. If the Business Logic 34 determines that the calling number is on the list of never-accessible numbers as depicted at step 93, the Business Logic 34, in conjunction with the SCP 24 may cause a connection in the form of a T1 link or any other suitable communication link to be established between the Intelligent Peripheral or Voice Response Unit (VRU) 38 and the MSC 18. The MSC 18 then couples the VRU 38 through to the calling party. An audible message specified by the Business Logic 34 is played to the calling party by the VRU 38 to indicate that the called party is not accessible as depicted at step 94. The SCP 24 then causes the T1 connection between the VRU 38 and the MSC 18 to be torn down and the SCP 24 signals the Signal Switching Point SSP 1 20 to disconnect the call from the calling party.

If the Business Logic 34 determines that the number of the calling party does not correspond to an always-accessible number or a never-accessible number, as depicted at step 96, the Business Logic determines whether the present time is within a period during which general phone usage is prohibited, e.g. between 8:00 am and 4:00 pm on a weekday in the instant example. If the present time is within a prohibited period, the Business Logic 34 causes a connection to be established between the VRU 38 and the calling phone P5 50 and causes the VRU 38 to play a message indicating that the called phone is not accessible at the present time as shown at step 97 of FIG. 4. If a cut-through code is entered within a predetermined time period as depicted in step 98, the Business Logic 34 verifies the cut-through code and the SCP 24 signals the MSC 18 to connect the calling party to the supervised phone P2 14 as shown in step 102 by forwarding a control message of a first type. If the proper cut-through code is not entered within the predetermined time period, the Business Logic 34 causes the SCP 24 to initiate SS7 signaling via a control message of a second type that causes the T1 connection between the VRU 38 and the MSC 18 to be broken and the call to be released as depicted in step 104.

If the Business Logic 34 determines that the present time is not within a time period specified within the respective user profile as a period during which general phone usage is prohibited per step 96, the Business Logic 34 determines whether a limit has been established for the number of minutes the phone may be used within a control period and whether the number of allotted minutes for the applicable control period have been exhausted as depicted at step 100. If the total number of allocated minutes for the control period have been exhausted, the Business Logic 34 in conjunction with the SCP 24 causes a connection to be made between the VRU 38 and the calling party via the MSC 18, and causes a message to be played by the VRU 38 indicating that the called party is not accessible as shown at step 97 of FIG. 4. If a proper cut-through code is entered within a specified time period, the Business Logic 34 causes a control message of a first type to be forwarded to the MSC 18 to signal the MSC 18 that the call should be connected. If the predetermined time period has expired without entry of a proper cut-through code, the Business Logic 34, in conjunction with the SCP 24, causes the connection between the VRU 38 and the MSC 18 to be torn down. The Business Logic 34 also initiates signaling of the MSC 18 via a control message of a second type that indicates that the call should not be completed.

If the Business Logic 34 determines that the allocated minutes for the control period for the called party have not been exhausted, the Business Logic 34 next determines whether the calling party has called the supervised user's phone when the phone happens to be at a geographic location at which the use of the phone is restricted as depicted in step 106. If it is determined in step 106 that the called phone is not at a location at which the use of the phone is restricted, the Business Logic 34 initiates signaling of the MSC 18 to cause the call from the calling party to the supervised user's phone P2 to be connected as depicted at step 108.

If the incoming call is placed to the supervised phone at a time when the supervised phone is at a location at which the use of the phone is restricted, a message may be played to the calling party advising that the called phone is not accessible as discussed above with respect to step 97. If a proper cut-through code is not entered within the predetermined time period, the Business Logic 34 initiates signaling of the MSC 18 to prevent the call from being connected as shown in step 104. Alternatively, if the calling party enters the applicable cut-through code as depicted in step 98, the Business Logic initiates signaling of the MSC 18 to instruct the MSC 18 to connect the call as shown in step 102.

It should be recognized that the order of the above steps may be varied and/or selected types of restrictions may be omitted, without departing from the presently disclosed invention and that the present invention involves the functions that are provided rather than the particular order in which such functions are realized. Additionally, the tests applied by the Business Logic 34 may be tests framed in the context of permissive use of the supervised phone rather than in terms of restrictions on use of the supervised phone. By way of example, the User Profile Database 32 in one embodiment includes parameters that define time intervals during which calls are permitted and/or locations at which calls are permitted. The Business Logic 34 in such embodiment is operative to test the current time to determine if the current time is within a time period during which use of the phone is permitted and/or test the current location to determine if the phone is at a location at which use of the phone is permitted. The Business Logic 34 initiates appropriate signaling to the MSC 18 depending upon the outcome of the comparisons.

Appropriate signaling between the MSC 18 and the Business Logic 34 via the SCP 24 is maintained to update the call usage information so that the number of minutes used by the supervised user within the respective control period does not exceed the total number of minutes allotted for general phone usage within the control period. Thus, the SCP 24, in response to a command from the Business Logic 34 may signal the home serving system MSC 18 to release a call upon a determination that the total minute allotment for the control period has been exhausted or allow the respective call to complete as discussed below. Prior to causing a call to be released due to the exhaustion of the total allotted minutes within the applicable control period, the Supervisory Control System 22 may cause a tone to be injected into the ongoing call between the calling party and the supervised phone to indicate to the respective subscribed user that the call is to be released after a predetermined period. This function may be initiated by the SCP 24, the Business Logic 34, or a combination of both depending upon the design partitioning in a given system. The warning tone may be played by the VRU 38 or injected via any other suitable device.

In an alternative embodiment, even if the total number of minutes used by a supervised user within a control period is exceeded during the pendency of a call, the Supervisory Control System 22 permits the call to continue to its completion by the parties. Subsequent general usage calls are blocked until a new control period commences or until modification of the usage controls within the User Profile Database 32 by the Supervisor S1 10 so as to permit further general usage calls.

4b. Supervisory Control System Operation for Outgoing Calls from a Supervisory Control System Subscriber Operation and signaling of the Supervisory Control System 22 with respect to an outgoing telephone call that is placed by a Supervisory Control System 22 subscriber P2 14 is described below with respect to FIG. 1 and flow charts of FIGS. 5 and 6. FIG. 1 is employed to illustrate the circumstance in which the wireless supervised phone P2 14 places a call to phone P5 50 that is initially received by the MSC 18 of the home serving system. It is assumed for purposes of the present discussion that Supervisor S1 10 has established a user profile for phone P2 14 and that the user profile for the phone P2 14 prohibits general phone usage during school hours from 8:00 am to 4:00 pm weekdays.

Figure 5:
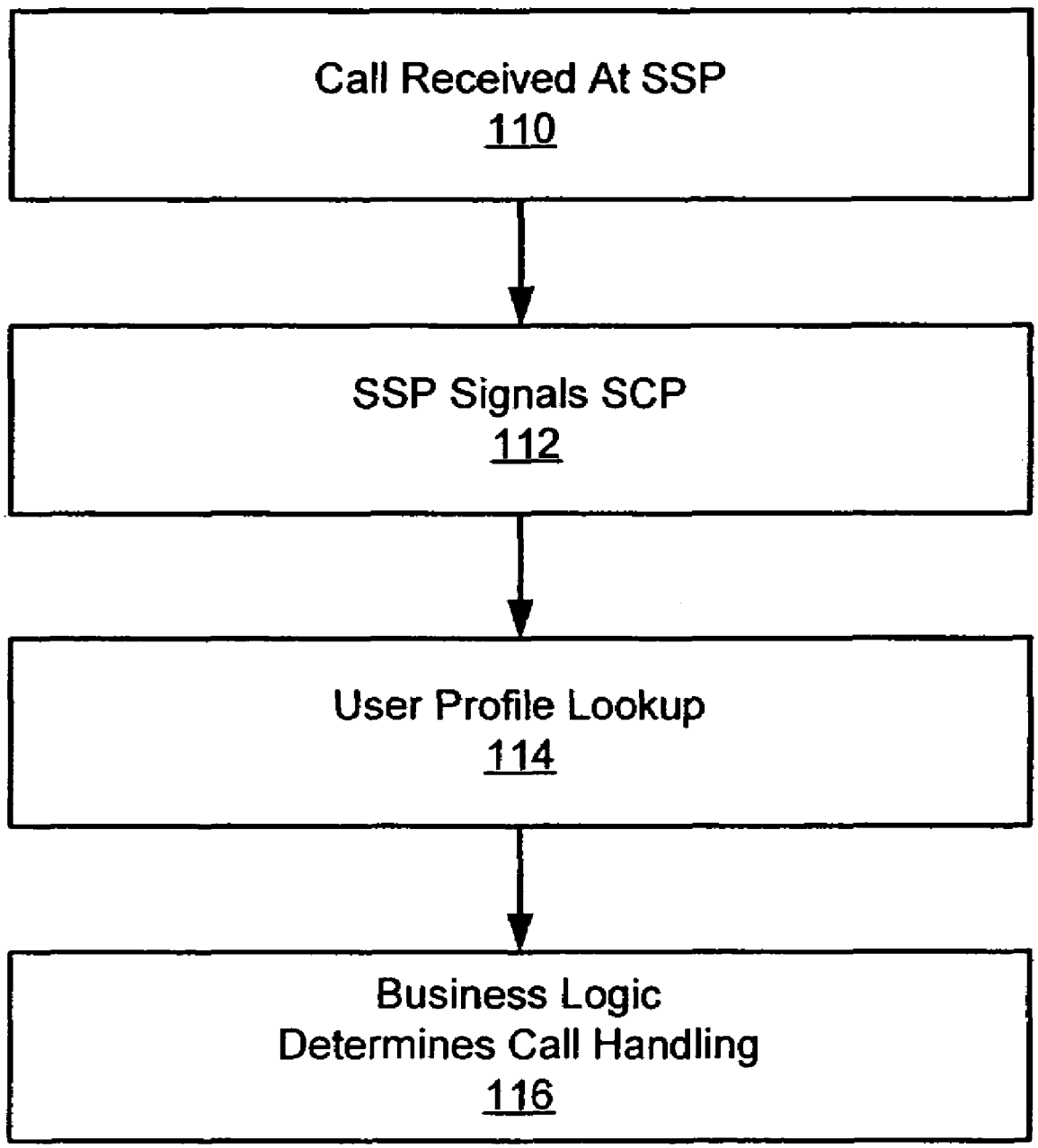
FIG. 5 is a flow chart depicting the processing of outgoing calls.

In the instant example, the call is placed by a calling party U2 46 from wireless phone P2 14 to a called party and is received at step 110 of FIG. 5 by the associated MSC 18 in SSP 1 20 as shown. The MSC 18 associated with SSP 1 20 accesses the respective Home Location Register (HLR) 56 and performs a lookup based on an extracted MSID. The HLR 56 contains a record that includes an indication whether service is required by the Supervisory Control System service provider. If an entry in the applicable HLR record indicates that the Supervisory Control System 22 should be signaled to advise of the pending call, SSP 1 20 signals the SCP 24 within the Supervisory Control System 22 to indicate that there is a pending call as depicted at step 112. If the applicable HLR record does not indicate that Supervisory Control System services are required, the call is processed in accordance with conventional call processing protocols.

Once the Supervisory Control System 22 receives a signal indicating that a call is pending from a Supervisory Control System subscriber, the Business Logic 34 within the SDP 30 of the Supervisory Control System 22 executes a program to determine what services and signaling need to be initiated by the Supervisory Control System 22.

More specifically, as depicted at step 114 of FIG. 5, the Business Logic 34 performs a lookup within the User Profile Database 32 to ascertain whether the MSID of the calling party corresponds to an MSID within the User Profile Database 32. If, as a consequence of the lookup, it is determined that the MSID corresponds to an MSID within the User Profile Database 32, the Business Logic 34 executes a program to ascertain how the call should be handled. In particular, if the MSID of the calling party corresponds to the MSID of a phone having a record within the User Profile Database 34, the Business Logic 34 accesses the relevant data within the applicable record of the User Profile Database 32, accesses current state information, such as time, date and calling number, and determines what action should be taken as illustrated at step 116. An exemplary series of steps that may be executed within the Business Logic 34 is described below with reference to FIG. 6.

Figure 6:
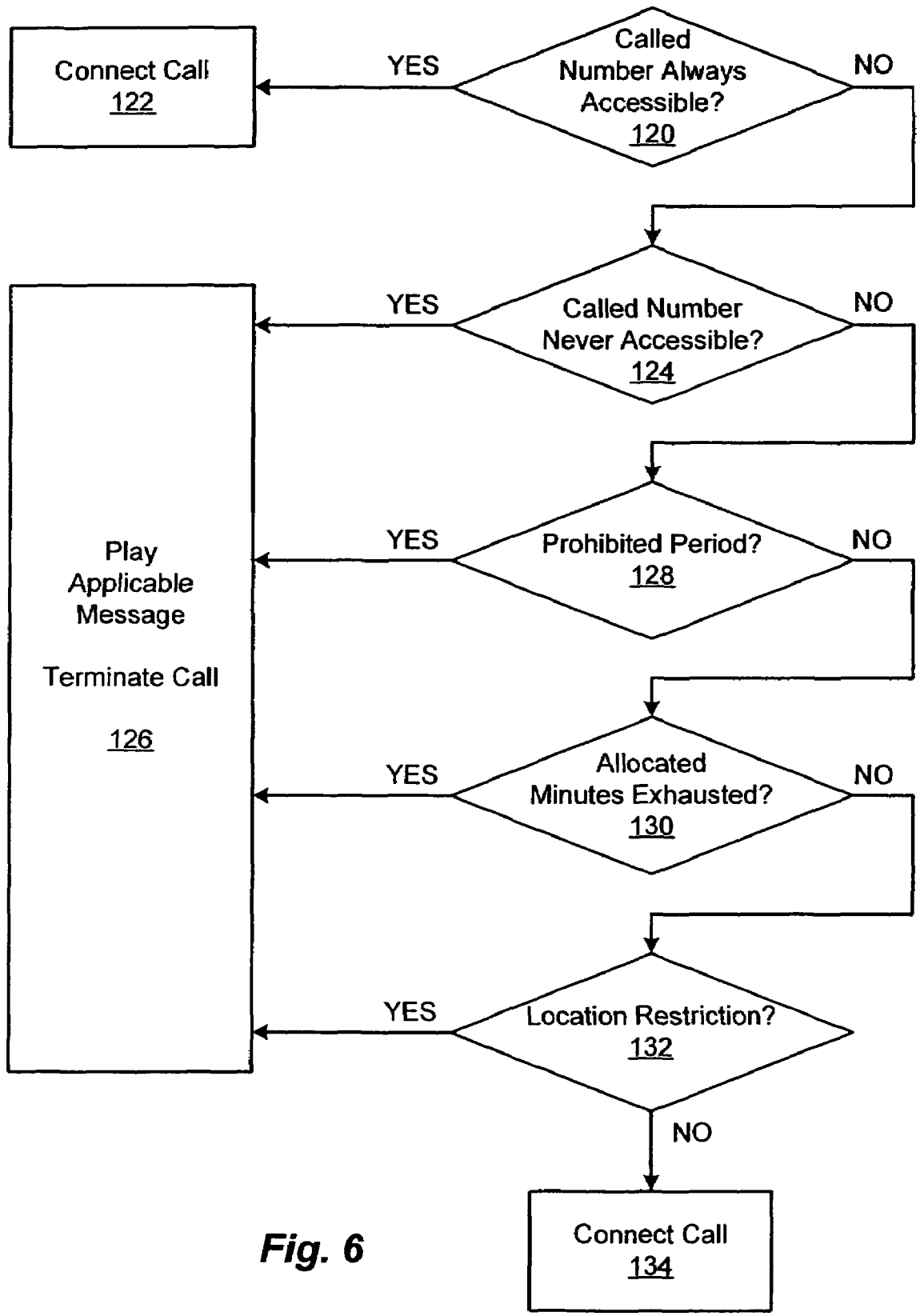
FIG. 6 is a flow chart depicting the processing of outgoing calls.

As shown at step 120 of FIG. 6, the Business Logic 34 determines whether the called number corresponds to an always-accessible telephone number, i.e. a telephone number that can always be accessed by the respective phone P2 14. For example, in the instant example, it is assumed that calls to one or more numbers associated with the Supervisor S1 10 (such as the Supervisor's home and wireless numbers) may always be completed. If the called number corresponds to a telephone number that is specified in the User Profile Database 32 as being always accessible, the Business Logic 34 signals the SCP 24 that the call can be put through as depicted at step 122, and the SCP 24 signals the MSC 18 then associated with the phone P2 14 to allow the call to be connected to the called party. In response, the SSP 1 20 routes the call from phone P2 14 through to the called party to establish the desired connection.

If the Business Logic 34 determines that the called number does not correspond to a number that is always accessible by the phone P2 14, the Business Logic 34 determines whether the called number corresponds to a number that is never permitted to be accessed by the phone P2 14 as illustrated at step 124. This determination is made by obtaining the called number from the DNIS or any other suitable identifier and by comparing the called number to the never-accessible numbers previously entered into the User Profile Database 32 by the Supervisor S1 10. If the Business Logic 34 determines that the called number is on the never-accessible list, the Business Logic 34 may cause a connection to be established between the Intelligent Peripheral or Voice Response Unit (VRU) 38 and the MSC 18 serving the phone P2 14 via a T1 link 60 as shown or via any other suitable communications link. The Business Logic 34 then causes an audible message to be played to the phone P2 14 via the VRU 38 to indicate to the User U2 46 that the called party is not accessible as illustrated at step 126. The Business Logic 34 finally causes the T1 link (or other connection) between the VRU 38 and MSC 18 serving the phone P2 14 to be torn down and causes the SCP 24 to signal the SSP 1 20 to prevent the call from the phone P2 14 to the called number from being connected by forwarding a control message to the SSP 1 20.

If the Business Logic 34 determines that the number of the called party does not correspond to an always-accessible number or a never-accessible number, the Business Logic 34 determines whether the present time is within a period during which general phone usage is prohibited as depicted at step 128, e.g. between 8:00 am and 4:00 pm on a weekday in the instant example. If the present time is within a prohibited period, the Business Logic 34 causes a connection to be established between the VRU 38 and the MSC 18 associated with the calling phone P2 14 and causes the VRU 38 to play a message indicating that the call cannot be connected at the present time. The Business Logic 34 then causes the T1 link 60 between the VRU 38 and the respective SSP 1 20 to be torn down and causes SCP 24 to signal the MSC 18 by forwarding a control message that indicates that the call should be released as shown at step 126.

If the Business Logic 34 determines that the present time is not within a time period specified within the respective user profile as a period during which general phone usage is prohibited, the Business Logic 34 determines whether the total number of allotted minutes for the month have already been exhausted as depicted at step 130. If the total number of minutes have been exhausted, the Business Logic 34 causes a connection to be made between the VRU 38 and the MSC 18 serving the calling phone P2 14, and causes a message to be played by the VRU 38 to the phone P2 14 indicating that the called party is not accessible as illustrated at step 126. The Business Logic 34 then causes the connection between the VRU 38 and the respective MSC 18 to be torn down and initiates signaling by the SCP 24 to have the call from wireless phone P2 14 released by the serving MSC 18.

If the Business Logic 34 determines that the allotment of minutes for the relevant control period have not been exhausted, the Business Logic 34 determines if the calling phone P2 is subject to a location restriction as depicted at step 132 and as specified in the User Profile Database 32. If the supervised user's phone P2 14 is subject to a location restriction, the Business Logic 34 causes a connection to be made between the VRU 38 and the MSC 18 serving the calling phone P2 14, and causes a message to be played by the VRU 38 to the phone P2 14 indicating that the called party is not accessible as illustrated at step 126. The Business Logic 34 then causes the connection between the VRU 38 and the respective MSC 18 to be torn down and initiates signaling by the SCP 24 to have the call from wireless phone P2 14 released by the serving MSC 18.

If the Business Logic 34 determines in step 132 that no location restriction is applicable to the use of the phone P2 14, the Business Logic 34 initiates signaling by the SCP 24 to the respective SSP 1 20 to connect the subscriber's phone P2 14 to the called party as shown at step 134.

It should be recognized that the order of the above steps may be varied and/or selected types of restrictions may be omitted.

4c. Updating of Phone Usage Information

Appropriate signaling between the respective SSP 1 20 and the Supervisory Control System 22 is maintained during a call to update the call usage information so that the total allotment of minutes for general phone usage within the control period is not exceeded unless permitted as specified in the User Profile Database 32. Time monitoring may be performed by the SCP 24, the Business Logic 34, or a combination of both based upon the particular design partitioning for the Supervisory Control System 22. Such time monitoring of call length may be performed by the Supervisory Control System 22 via a signaling path between the SCP 24 and the respective MSC 18 that is maintained while the call is pending. The Supervisory Control System 22 updates the minutes remaining and may cause the SCP 24 to signal the SSP 1 20 associated with the calling party to release the call upon determining that the allotment of minutes for the control period has been exhausted if so specified by the Supervisory Control System 22.

In an alternative embodiment, even if the total number of minutes used by a supervised user within a control period is exceeded during the pendency of a call, the Supervisory Control System 22 permits the call to continue to its completion by the parties. Subsequent general usage calls are blocked until a new control period or modification by the Supervisor S1 10 of the usage controls within the User Profile Database 32 so as to permit further general usage calls.

Other desired supervisory functions may be performed by the Business Logic 34. Signaling between the Supervisory Control System platform 22 and the applicable SSP 1 20 may be accomplished via any suitable signaling technique.

4d. Roaming Scenarios

Figure 2:
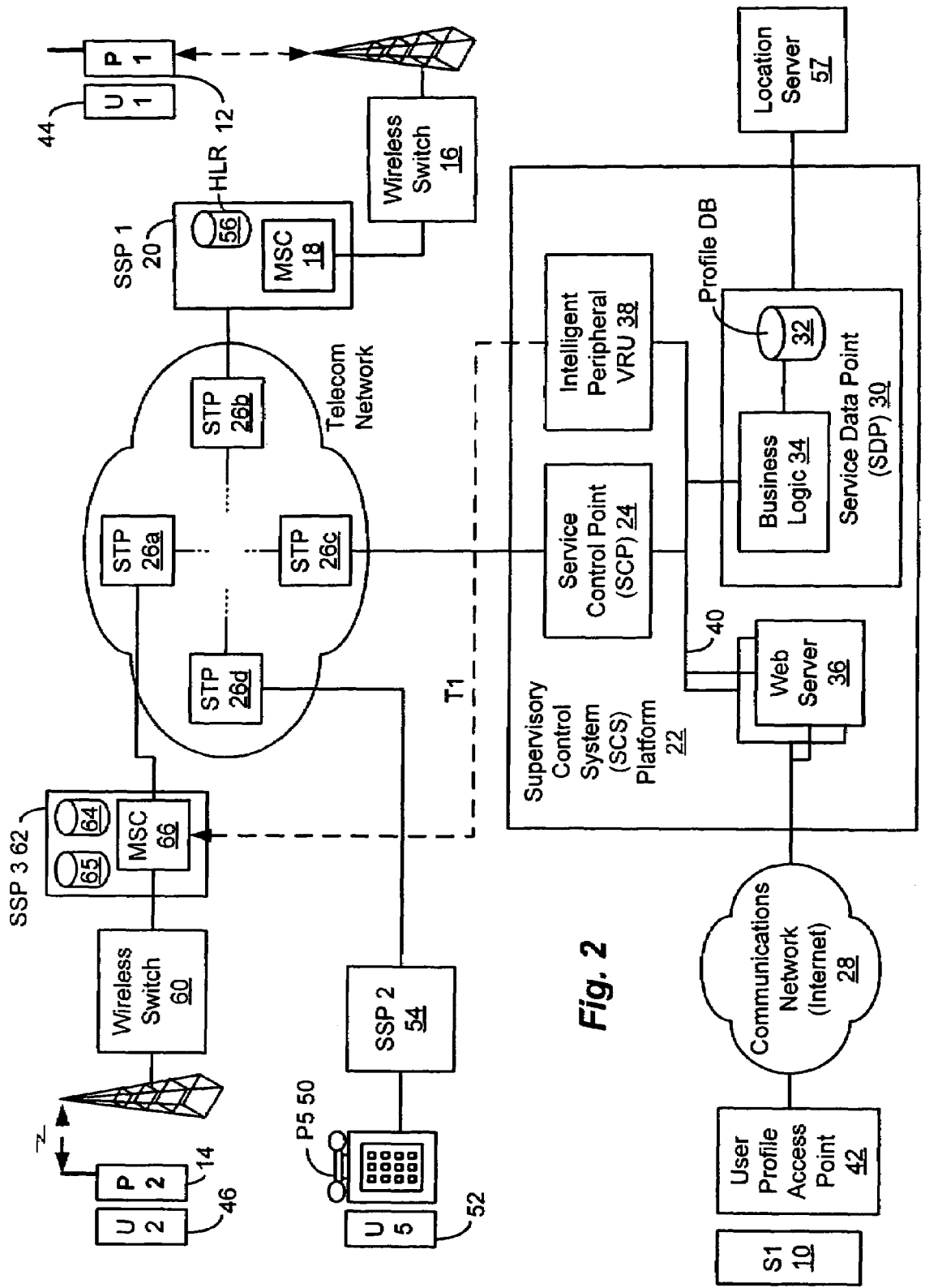
FIG. 2 is another block diagram depicting a system operative in accordance with the present invention.

FIG. 2 depicts the circumstance in which a supervised wireless phone is served by an MSC outside the home system. In the instance in which the subscriber U2 46 is roaming, when the subscriber activates the phone P2 14, the MSC 66 accesses a central database 64 using an MSID for the roaming phone to perform a record lookup. The record retrieved from the central database 64 is used to populate the Visitor Location Register (VLR) 65 for the respective MSC 66 as is known in the art. When a call that is placed from the wireless phone P2 is received by the local MSC 66, the MSC 66 uses an MSID associated with the calling wireless phone P2 to perform a lookup within the VLR 65. The record obtained from the VLR includes information instructing the MSC 66 to signal the Supervisory Control System 22 if Supervisory Control System services may be required. Once the SCP 24 within the Supervisory Control System is signaled that Supervisory Control System services are required, processing within the Supervisory Control System 22 proceeds generally as described above, noting that appropriate SS7 signaling is employed as is known in the art for completion, release, and VRU messaging of wireless calls initiated from serving systems other than the home serving system.

Additionally, the Supervisory Control System 22 is invoked with respect to calls received by the supervised phone P2 14 when the phone P2 14 is roaming, noting that appropriate SS7 signaling is employed as is known in the art for completion, release, VRU messaging and tone injection for wireless calls that are received by the supervised phone P2 14.

4e. Enterprise Embodiment

While the preceding examples have described operation of the disclosed system in the context of a parent supervising the wireless phones of children, the disclosed system may similarly be used by a manager within an enterprise to control the usage of wireless phones by employees under his or her supervision. For example, a business organization with a number of employees may be broken down as the following example indicates:

Senior Management—4

Sales—5

Client and Field Support—10

In the present example, 19 phones are available for senior management, sales, and client and field support, collectively, and each employee is to be separately allocated a number of minutes for phone use during the control period. The business does not plan to control usage among Senior Management and Sales employees, but desires to control usage among client and field support employees. Accordingly, the Supervisory Control System account for the business is configured by the responsible manager and the 10 phones provided to the Client and Field Support employees may be treated as a single group of users as further discussed.

The manager navigates to a predetermined Web-site and is prompted to create the necessary Supervisory Control System account. The manager provides his name, company name, service account number for the business, and email address, and creates a login name and password. The manager then defines the wireless phones that are to be controlled under the Supervisory Control System account. The wireless phones under supervision are thus associated with a corporate Supervisory Control System account number for the business. For example, in the case where 10 phones are identified in association with the Supervisory Control System account, an account summary screen may be presented on which an identification of the 10 phones is entered. The manager is then permitted to provision a name next to each of the 10 phones. In one embodiment, by default, the 10 phones are initially setup in a single generic "group" in which they are enabled minimally to call each other. However, though they are initially provisioned to call each other, the manager may further add other names and numbers that the phones should be always available, with respect to calls from and/or to the phones in the initial group, including headquarters numbers, other wireless numbers for employees, etc. Additionally, the manager may establish a specific number of allocated "general purpose" minutes that each phone in the group is allocated to use on a periodic basis. This allocation allows the employee to place calls to other numbers until the allocation has been exhausted. Similarly, a never-accessible list of numbers may be defined for the group. The never-accessible list includes numbers that cannot be the source or destination number for calls involving the respective supervised phone.

At this point, the provisioning process is complete, and the phones are available for use. The manager, for example, is shown an account summary screen, showing the phones as members of a "Default Group". At a subsequent point in time, the manager may wish to perform management functions with respect to the previously defined Supervisory Control System account. When the manager subsequently logs into the system via the Web server, he or she is again taken to the account summary screen. On the account summary screen, the last view of the managed groups is displayed. For example, an "open" default group folder would be displayed, and a "modify properties" button shown with the 10 phones below it, and showing the MSID, Name, Used/Allocated minutes and a "modify properties" button for each phone. If the manager clicks on the "modify properties" button on for the default group, he or she is enabled to perform the following functions:

(a) Modify the numbers listed under the always-accessible and never-accessible lists, by editing numbers on the lists, and adding or deleting number to or from the lists respectively, (b) Modify the allocation of minutes for the control period for the group, (c) Modify any incoming or outgoing call time restrictions associated with the group, and (d) Modify any other restrictions maintained in the User Profile Database 32 that may be specified by the Supervisor.

When modifying group properties, the modifications take effect for all members of the group. Additionally, the usage properties of the phones may be separately modified. Additionally, where particular messages are specified to be played on the occurrence of certain associated events, such as call blocking, those messages may be defined on a group wide basis. When it is desired to add new phones to the account, for example, when more phones are purchased for new client services employees, the manager can add those phones to the existing group through the Web Server interface after their service is provisioned by the wireless carrier. When the manager logs onto the graphical user interface provided by the Web server 36, the new phones automatically appear as part of the default group, and automatically take on the properties of the default unless the manager "moves" them, for example by a drag-and-drop operation, into another group. The manager is also enabled to define and/or define the name(s) associated with the new phones through the Web Server 36. In this way, multiple user groups can be defined and named with associated use parameters, and users can conveniently be added to and/or moved between the various groups within an Supervisory Control System account.

Additionally, wireless phones of supervised users may include a resident program that permits a client application to be downloaded from the Supervisory Control System 22. For example a Binary Runtime Environment for Wireless (BREW) application that provides a user interface for quick access to the always-accessible numbers they can call, by name, may be downloaded from the Supervisory Control System 22. Such a client application may be configured to connect to the Supervisory Control System 22 at startup to retrieve always-accessible numbers.

4f. SIM Embodiment

The disclosed system may employ a Subscriber Identity Module (SIM) module within the wireless phone to provide certain filters for outgoing calls from the respective wireless phone under supervision. In such an embodiment, parameters relevant to outgoing call restrictions may be downloaded or otherwise communicated to the SIM within the respective wireless phone from the User Profile Database 32 and may then be stored on and processed using the SIM when an outgoing call is dialed from the respective wireless phone. By way of example, and not limitation, location restrictions, never-accessible number restrictions, time of day restrictions and/or date restrictions specific to the user may be stored within the SIM of the respective wireless phone. In response to the dialing of an outgoing number, the restrictions applicable to the respective phone and stored within the SIM may be tested to determine whether the connection of the call would be contrary to any restrictions. The processing logic associated with this determination may be made by a processor within the SIM or within the wireless phone. Additionally, the parameters defining the use restrictions (or permissive uses) may be stored on a memory within the SIM or alternatively within portions of a memory shared with program code executed by a processor within the wireless handset. By filtering outgoing calls in the above-described manner, network traffic and external processing is reduced since signaling to the Supervisory Control System 22 is avoided and processing pertaining to calls filtered by the SIM need not be performed by the Supervisory Control System 22. The relevant parameters for such outgoing call restrictions may be updated when the phone is powered on and registered within the wireless network to assure that the parameters reflect the current parameters pertaining to use restrictions for the respective wireless phone.

5. System Architecture

The presently described supervisory system may be employed in conjunction with a billing process for wireless phones. For example, call rating data and other parameters applicable to billing functions may be stored in a first database that is used by a first server to perform the billing functions as known in the art, such as a prepaid billing process for wireless phones.

A second database may be used to store parameters applicable to the presently disclosed supervisory restrictions and a second server executing the presently disclosed supervisory process and including the functions of the Business Logic 34 may be employed to determine whether to connect a call in view of the stored supervisory restrictions.

The supervisory process may operate as an overlay to the billing process. For example, in a prepaid wireless environment, a determination may be made whether sufficient funds have been prepaid for the call to be connected upon execution of the billing process in the first server. If sufficient funds exist in the prepaid account for a call to be connected, the supervisory process may then be executed to determine whether the call should be connected. It should be understood that the order of execution of the billing process and the supervisory process may be reversed. The billing process and the supervisory process may be executed within first and second servers that are separate servers. Alternatively, the first and second servers may comprise the same server and the billing process and the supervisory process may be executed within the same server.

It will be further appreciated by those skilled in the art that while the exemplary embodiments are illustrated in terms of wireless phone communications, the inventive concepts described herein are equally applicable to data messaging services, such as short messaging service (SMS) and the presently disclosed concepts may be employed to restrict or permit such communications. With respect to restrictions on data messaging devices, in addition to restrictions applicable to data communication devices, such as time of day, location, and devices associated with specific individuals, restrictions may be imposed on the number of bytes and/or messages to be communicated during a control period. The determination whether to permit a data communication to be completed may be made at the Supervisory Control System 22. Additionally, determinations whether to restrict outgoing messaging from a wireless device may be made using a processor within the wireless device to reduce network traffic.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives). In addition, while the invention may be embodied in computer software, the functions necessary to implement the invention may alternatively be embodied in part or in whole using hardware components such as Application Specific Integrated Circuits or other hardware, or some combination of hardware components and software.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

What is claimed is:

1. A computer based method of controlling the use of a wireless device comprising the steps of:
    creating in a database a supervisory account having a supervisory account identifier associated with said supervisory account, said supervisory account including information pertaining to the use of at least one wireless device including said wireless device, said information being protected by a password and, at least some of said information being modifiable by an administrator of said supervisory account having access to said password;
    storing in said supervisory account in association with said supervisory account identifier in response to a request by said administrator, a wireless device identifier associated with said wireless device and at least one modifiable restriction governing the use of said wireless device;
    storing in said database in association with said supervisory account identifier, a code value corresponding to a cut-through code, wherein said code-value is useable by said administrator to permit said administrator to establish communication with said wireless device at a time when the use of said wireless device is restricted;
    receiving an indication of an intended communication from a communication device to said wireless device;
    determining whether said intended communication violates said at least one restriction governing the use of said wireless device prior to connection of said communication between said communication device and said wireless device;
    in the event said determining step indicates that the connection of said intended communication violates said at least one restriction and an input value corresponding to said stored code value is not received from said communication device within a predetermined time interval, generating a control message of a first type to prevent said communication from proceeding; and
    in the event said determining step indicates that the connection of said intended communication would violate said at least one restriction pertaining to the use of said wireless device and said input value corresponding to said code value is received from said communication device within said predetermined time interval, generating a control message of a second type to allow said communication to be proceed.

2. The method of claim 1 wherein said step of storing said code value corresponding to said cut-through code comprises the step of storing in said supervisory account a user name and utilizing a value corresponding to said user name as said code value.

3. A computer based system for controlling the use of a wireless device by a wireless device user, said system comprising:
    a database stored in a storage device, said database including a supervisory account and a supervisory account identifier associated with said supervisory account, said supervisory account including information pertaining to the use of at least one wireless device including said wireless device, said information contained in said supervisory account being protected by a password and modifiable by an administrator of said supervisory account having access to said password;
    said supervisory account containing, in association with said supervisory account identifier, a wireless device identifier associated with said wireless device and at least one parameter defining at least one restriction governing the use of said wireless device by said wireless device user;
    said supervisory account having an associated code value corresponding to a cut-through code, wherein said code value is stored in association with said supervisory account identifier and wherein said code-value is useable by said administrator to establish communication with said wireless device at a time when the use of said wireless device is restricted;
    at least one computer operative to:
    receive an indication of an intended communication from a communication device to said wireless device;
    determine using said at least one parameter whether said intended communication violates said at least one restriction governing the use of said wireless device prior to connection of said communication between said communication device and said wireless device;

generate a control message of a first type to prevent said communication from proceeding in the event said at least one computer determines that the connection of said intended communication would violate said at least one restriction and an input value corresponding to said stored code value is not received from said communication device within a predetermined time interval; and generate a control message of a second type to allow said communication to proceed in the event said at least one computer determines that the connection of said intended communication would violate said at least one restriction pertaining to the use of said wireless device and said input value corresponding to said code value is received from said communication device within said predetermined time interval.

4. The system of claim 3 further including:

an access point and a web server communicably coupled via a data network;

a data path between said web server and said database;

said access point operative to receive as an input from said administrator of said supervisory account a user name and to communicate said user name to said supervisory account;

said system operative to store said user name in association with said supervisory account identifier; and said at least one computer being operative to utilize said user name as said code value.

5. The system of claim 4 wherein said data path includes said at least one computer.

6. A computer based method of controlling the use of a wireless device comprising the steps of:

creating in a database contained in a storage device a supervisory account, said supervisory account having a supervisory account identifier for identifying said supervisory account, said supervisory account configured to include a plurality of user account profiles, each of said user account profiles configured to include a wireless device identifier and at least one restriction pertaining to the use of the respective wireless device by a corresponding wireless device user, said supervisory account containing information including:

a user account profile pertaining to said wireless device, said user account profile including a wireless device identifier for said wireless device and at least one restriction pertaining to the use of said wireless device, a cut-through code associated with said supervisory account, said cut-through code being useable by an administrator of said supervisory account to establish communication with said wireless device notwithstanding a restriction on the use of said wireless device within said user account profile for said wireless device that would preclude communication with said wireless device, at least some of said information in said user account profile, including said at least one restriction pertaining to the use of said wireless device, being protected by a password known to said administrator and modifiable by said administrator of said supervisory account;

receiving at a server an indication of an intended communication from a communication device to said wireless device;

determining at said server whether said intended communication violates a restriction governing the use of said wireless device stored in the user account profile for said wireless device;

in the event said determining step indicates that the connection of said intended communication from said communication device to said wireless device would violate said at least one restriction on the use of said wireless device, permitting the communication between said communication device and said wireless device in the event an input value corresponding to said cut-through code is input at said communication device and communicated to said server; and in the event said determining step indicates that the connection of said intended communication from said communication device to said wireless device would violate said at least one restriction on the use of said wireless device, preventing the communication between said communication device and said wireless device in the event an input value corresponding to said cut-through code is not input at said communication device and communicated to said server.

7. The method of claim 6 further including the step of permitting said communication between said communication device and said wireless device in the event said server determines that said intended communication does not violate a restriction pertaining to the use of said wireless device stored in the respective user account profile.

8. The method of claim 6 wherein:

said step of permitting the communication comprises the step of permitting the communication between said communication device and said wireless device in the event an input value corresponding to said cut-through code value is input at said communication device and communicated to said server within a predetermined time period from the receiving at said server of said indication of said intended communication, and said step of preventing the communication comprises the step of preventing the communication between said communication device and said wireless device in the event an input value corresponding to said cut-through code value is not input at said communication device and communicated to said server within said predetermined time period from the receiving at said server of said indication of said intended communication.

* * * * *